United States Patent
Wang

(10) Patent No.: US 9,836,815 B2
(45) Date of Patent: Dec. 5, 2017

(54) DISPLAY METHOD, DISPLAY DEVICE AND DISPLAY SYSTEM

(71) Applicant: BOE TECHNOLOGY GROUP CO., LTD., Beijing (CN)

(72) Inventor: Yanfeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 698 days.

(21) Appl. No.: 13/955,440

(22) Filed: Jul. 31, 2013

(65) Prior Publication Data

US 2014/0035955 A1 Feb. 6, 2014

(30) Foreign Application Priority Data

Aug. 1, 2012 (CN) .......................... 2012 1 0272306
Jul. 10, 2013 (CN) .......................... 2013 1 0289018

(51) Int. Cl.
  *G06T 3/40* (2006.01)
  *G09G 5/00* (2006.01)
(52) U.S. Cl.
  CPC ............... *G06T 3/40* (2013.01); *G09G 5/005* (2013.01); *G09G 2330/021* (2013.01); *G09G 2330/022* (2013.01)
(58) Field of Classification Search
  CPC .................................. G09G 5/005; G06T 3/40
  USPC ....................................................... 345/660
  See application file for complete search history.

(56) References Cited

U.S. PATENT DOCUMENTS

| 6,002,446 | A | * | 12/1999 | Eglit | .................... | G06T 3/4007 345/660 |
| 7,180,550 | B2 | | 2/2007 | Jun | | |
| 2002/0030673 | A1 | | 3/2002 | Ikemoto | | |
| 2003/0043140 | A1 | * | 3/2003 | Ko | ......................... | G09G 5/005 345/211 |
| 2004/0239696 | A1 | * | 12/2004 | Okabe | ................... | G09G 3/325 345/690 |
| 2006/0139379 | A1 | | 6/2006 | Toma et al. | | |
| 2006/0139966 | A1 | * | 6/2006 | Lin | ................... | H02M 3/33592 363/21.04 |

(Continued)

FOREIGN PATENT DOCUMENTS

CN 1823368 A 8/2006
GB 2355840 A 5/2001

(Continued)

OTHER PUBLICATIONS

Korean Notice of Allowance Appln. No. 10-2013-0091538; dated Dec. 22, 2014.

(Continued)

*Primary Examiner* — Devona Faulk
*Assistant Examiner* — Hai Tao Sun
(74) *Attorney, Agent, or Firm* — Ladas & Parry LLP

(57) ABSTRACT

A display device comprises a timing controller (TCON), a scaler, a buffer and a comparator; the comparator is used for comparing whether pixel data of a current frame image from the scaler are identical with pixel data stored in the buffer or not; in the case where the comparison result is "identical", the scaler enters an off-operating state; and the TCON is used for acquiring pixel data of the current frame image to be displayed and outputting the pixel data for display. A display method and a display system for the display device are provided as well.

17 Claims, 5 Drawing Sheets

(56) References Cited

U.S. PATENT DOCUMENTS

| | | |
|---|---|---|
| 2007/0044138 A1 | 2/2007 | Yang et al. |
| 2007/0280357 A1 | 12/2007 | Sung |
| 2008/0111787 A1 | 5/2008 | Jung et al. |
| 2009/0033969 A1 | 2/2009 | Inoue |
| 2009/0153597 A1* | 6/2009 | Sheu ............... G09G 3/20 345/698 |
| 2010/0156965 A1* | 6/2010 | Kim ............... G09G 3/3688 345/691 |
| 2011/0148826 A1* | 6/2011 | Koyama ............... G09G 3/3696 345/204 |
| 2013/0169656 A1* | 7/2013 | Cheng ............... G06F 13/38 345/534 |

FOREIGN PATENT DOCUMENTS

| | | |
|---|---|---|
| JP | 2001-331146 A | 11/2001 |
| JP | 2010-026219 A | 2/2010 |
| JP | 2013076855 A | 4/2013 |
| KR | 1020040102918 A | 8/2004 |
| KR | 1020060018393 A | 3/2006 |

OTHER PUBLICATIONS

First Chinese Office Action Appln. No. 201310289018.3; dated Dec. 9, 2014.
First Korean Office Action dated Jun. 7, 2014; Appln, No. 10-2013-0091538.
European Patent Office Communication Appln. No. 13178551.1-1904; dated Jun. 9, 2015.
EPO Office Action dated Mar. 31, 2016; Appln. No. 13 178 551.1-1904.
Japanese Office Action dated May 15, 2017, Appln. No. 2013-158681.
Extended European Search Report dated Oct. 29, 2013; 13178551.1-1904.

* cited by examiner

DISPLAY METHOD, DISPLAY DEVICE AND DISPLAY SYSTEM

TECHNICAL FIELD

Embodiments of the disclosure relate to a display method, a display device and a display system.

BACKGROUND

With the development of social economy, computers, televisions and a variety of electronic products are widely applied. Meanwhile, the problem of large energy consumption is incurred. Therefore, the production of energy-saving products becomes a trend for the development of the current electronic products.

Sometimes the fineness (resolution) of video output signals may be inconsistent with the display fineness (resolution) of a display, so that a scaler chip is usually required to be arranged inside the traditional display device. The scaler chip is used for performing scaling processing on frame images of the video signals, so that the signal fineness and the display fineness can be completely matched with each other. Moreover, the processed images are outputted to a timing controller (TCON) and displayed on a display screen.

SUMMARY

The disclosure provides a display method, a display device and a display system, which can avoid the phenomenon that a scaler performs scaling processing on the same frame image content repetitively and hence avoid high energy consumption.

One aspect of the disclosure provides a display device, used for displaying a video signal including a plurality of successive frame images, comprising a timing controller (TCON), a scaler, a buffer and a comparator; the scaler is used for performing scaling processing on the frame images of the video signal to generate pixel data for display; the buffer is used for storing the pixel data obtained by the scaling processing on the frame images by the scaler; the comparator is used for comparing whether pixel data of a current frame image from the scaler are identical with the pixel data stored in the buffer or not and outputting a comparison result; the TCON is used for acquiring pixel data of the current frame image to be displayed and outputting the pixel data for display; and if the comparison result outputted by the comparator is "identical", the scaler enters an off-operating state which lasts for a predetermined time period or a predetermined frame amount; and if the comparison result outputted by the comparator is "non-identical", the scaler enters an operating state, and the pixel data stored in the buffer are updated by pixel data of the current frame image subjected to scaling processing.

Another aspect of the disclosure discloses a display method for the above display device, comprising the following steps of: comparing through the comparator whether the pixel data of the current frame image from the scaler are identical with the pixel data stored in the buffer or not, in which if the comparison result of the comparator is "identical", the scaler is controlled to enter the off-operating state which lasts for a predetermined time period or a predetermined frame amount; and if the comparison result of the comparator is "non-identical", the scaler is controlled to enter the operating state, and the pixel data stored in the buffer are updated by the pixel data of the current frame image subjected to scaling processing; and outputting a frame image, corresponding to the pixel data stored in the buffer, for display through the TCON.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The accompanying drawings for the embodiments are simply described below to give a clear understanding of the technical proposals of the embodiments of the disclosure.

DETAILED DESCRIPTION

In order to make objects, technical details and advantages of the embodiments of the disclosure more apparent, the technical solutions of the embodiments will be described in a clearly and fully understandable way in connection with the drawings related to the embodiments of the disclosure. Apparently, the described embodiments are just a part but not all of the embodiments of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at lease one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The inventor noted in practice that when a traditional display device displays video images, a scaler chip is required to perform scaling processing on each frame of video signals and even performs the same scaling processing on frames having identical contents repetitively, and thus the energy consumption is relatively high.

An embodiment of the disclosure provides a display device, a buffer of the display device is used for storing pixel data obtained by the scaling processing for frame images by a scaler; a comparator is used for comparing pixel data of a current frame image with the pixel data stored in the buffer; when the pixel data of the current frame image and the pixel data stored in the buffer are identical to each other, the scaler does not operate, i.e., stop operating; and at this point, a TCON can act for directly outputting the pixel data of the frame image stored in the buffer so as to display the corresponding frame image. Compared with the traditional display device, the display device provided by the embodiment of the disclosure has low energy consumption.

Figure 1:
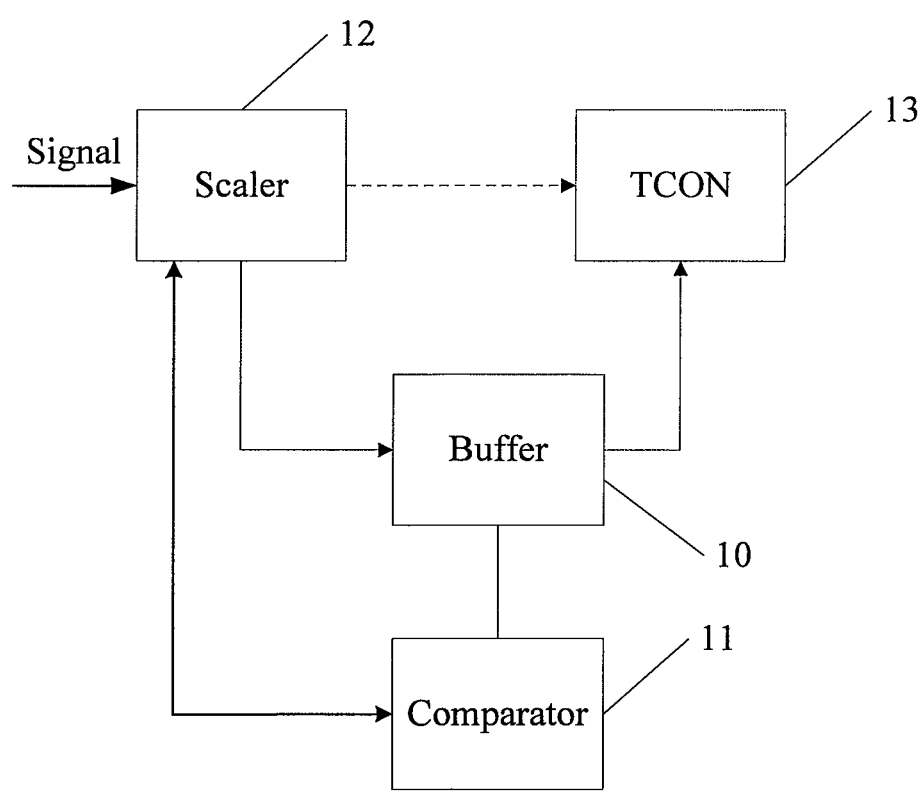
FIG. 1 is a structure block diagram of a display device provided by a first embodiment of the disclosure.

A display device is provided in a first embodiment of the disclosure. As illustrated in FIG. 1, the display device comprises a buffer 10, a comparator 11, a scaler 12 and a TCON 13. The display device is used for displaying video signals (signal streams) including a plurality of successive frame images, and every two adjacent frame images may be identical or non-identical (different) to each other.

The scaler 12 is used for performing scaling processing on each frame image of the video signals to generate pixel data of the frame image for display, and may further change its operating state according to the comparison result outputted by the comparator 11, for example, may transfer from its operating state into its off-operating state. In addition, the fineness of the pixel data obtained by scaling processing, for instance, is identical with that of a display screen corresponding to the display device. The buffer 10 can be used to store pixel data obtained from the scaling processing on the frame images of the video signals by the scaler 12.

The comparator 11 is used for comparing whether pixel data of a frame image to be displayed currently (a current frame image), obtained from the scaler 12, is identical with the pixel data after scaling processing, stored in the buffer 10, and outputting a comparison result. When the comparison result outputted by the comparator 11 indicates that both the pixel data are identical to each other, the scaler 12 enters the off-operating state, namely not performing scaling processing on a subsequent frame image or subsequent frame images in the video signals; and meanwhile, the pixel data stored in the buffer 10 are sent to the TCON 13 for display. When the comparison result outputted by the comparator 11 indicates that both the pixel data are non-identical to each other, the scaler 12 enters the operating state (or keep the operating state) and performs scaling processing on the subsequent frame image; the pixel data originally stored in the buffer 10 are updated by the pixel data of the current frame image subjected to scaling processing; and the current frame image is sent to the TCON 13 for display.

The TCON 13 acts for successively acquiring pixel data of a frame image to be displayed and outputting the pixel data for display. For example, when the scaler 12 is in the off-operating state, the TCON 13 outputs the pixel data stored in the buffer 10 to display a corresponding frame image. When the scaler 12 is in the operating state, the TCON 13 outputs pixel data obtained by the scaling processing on the current frame image by the scaler 12 so as to display the corresponding frame image. The TCON 13, for instance, may directly acquire the pixel data after scaling processing from the scaler 12 or acquire the updated pixel data from the buffer 10. If the TCON 13 acquires the pixel data of the frame image to be displayed from the buffer 10 in either case regardless of the state of the scaler 12, the design of the display device can be simplified. Moreover, the TCON 13, for instance, may be connected with a timing signal generator (not shown) and controlled by the timing signal generator to operate in accordance with a predetermined timing (frequency).

In an example of the first embodiment, when the scaler 12 enters the off-operating state, the off-operating state lasts for a predetermined time period "t" or a predetermined frame amount "n," namely the off-operating state continues till the scaler 12 spontaneously enters the operating state again after the predetermined time period t or the time period in which n successive frame images in a video signal (signal stream) to be displayed currently have passed. The parameter "t" herein refers to the absolute time span, while "n" refers to the relative time span and depends on the frequency of the video signals.

The quantity (value) of t and n may be preset by those skilled in the art according to experience or actual need or may be flexibly set as desired. For example, furthermore t and n may be adjusted in real time during display in view of specific conditions of the displayed contents. For example, if the video to be displayed is of a strong sense of dynamics, t and n can be set to be small. The value of t may be set to be 1/60, 1/30 or 1/15 ms, and the value of n may be set to be several or a dozen of frames, etc. If the video is of a slow style, t and n may be set to be large. The value of t may be set to be 1/15 ms, and the value of n may be set to be between dozens of frames and hundreds of frames. If the video has dynamic images, t and n may be set to be small; and even the value of t may be set to be 1/60 ms, and the value of n may be set to be 1. The relationship between frame and time may determined depend on the frequency in the traditional technology, for instance, 1 frame corresponds to 16.67 ms (1/60 m) or less.

In the display device provided by the first embodiment, the buffer 10 is adapted for storing pixel data of a frame image after scaling processing by the scaler 12, and the comparator 11 is adapted for comparing whether the pixel data of the current frame image from the scaler 12 are identical with the pixel data of one preceding frame image stored in the buffer 10. When the comparison result indicates that both the pixel data are identical to each other, the scaler enters the off-operating state. Therefore, the power consumption of the system can be reduced and the energy can be saved.

Figure 2:
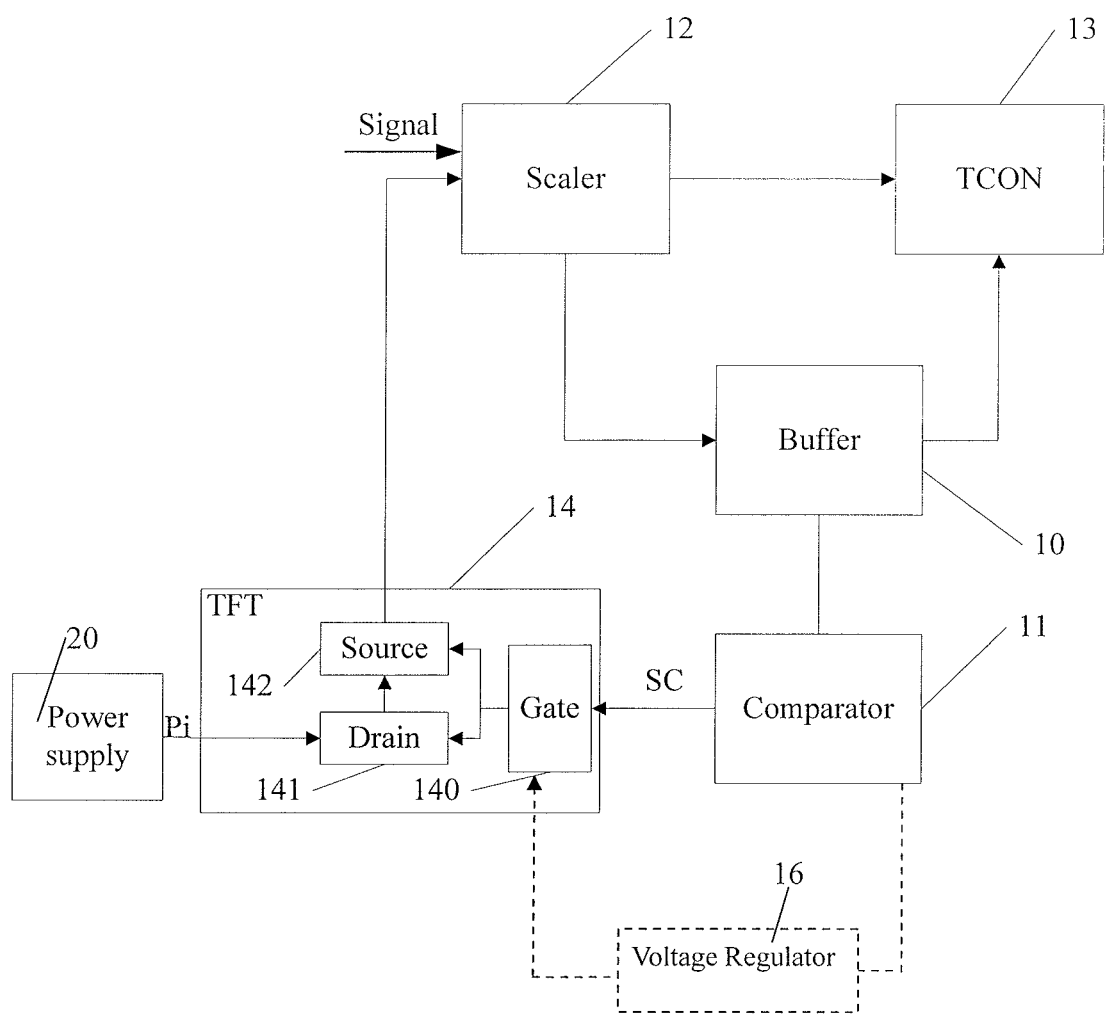
FIG. 2 is a structure block diagram of a display device provided by a second embodiment of the disclosure.

The technical solution of the first embodiment is further modified in the second embodiment of the disclosure for illustration purpose only. As illustrated in FIG. 2, the display device of the second embodiment comprises a switcher 14 used for controlling the operating state of the scaler 12 according to the result of the comparator 11. Preferably, for instance, in the present embodiment, a level signal may be used for controlling the operating state of the switcher 14 and hence controlling the operating state of the scaler 12.

Figure 3:
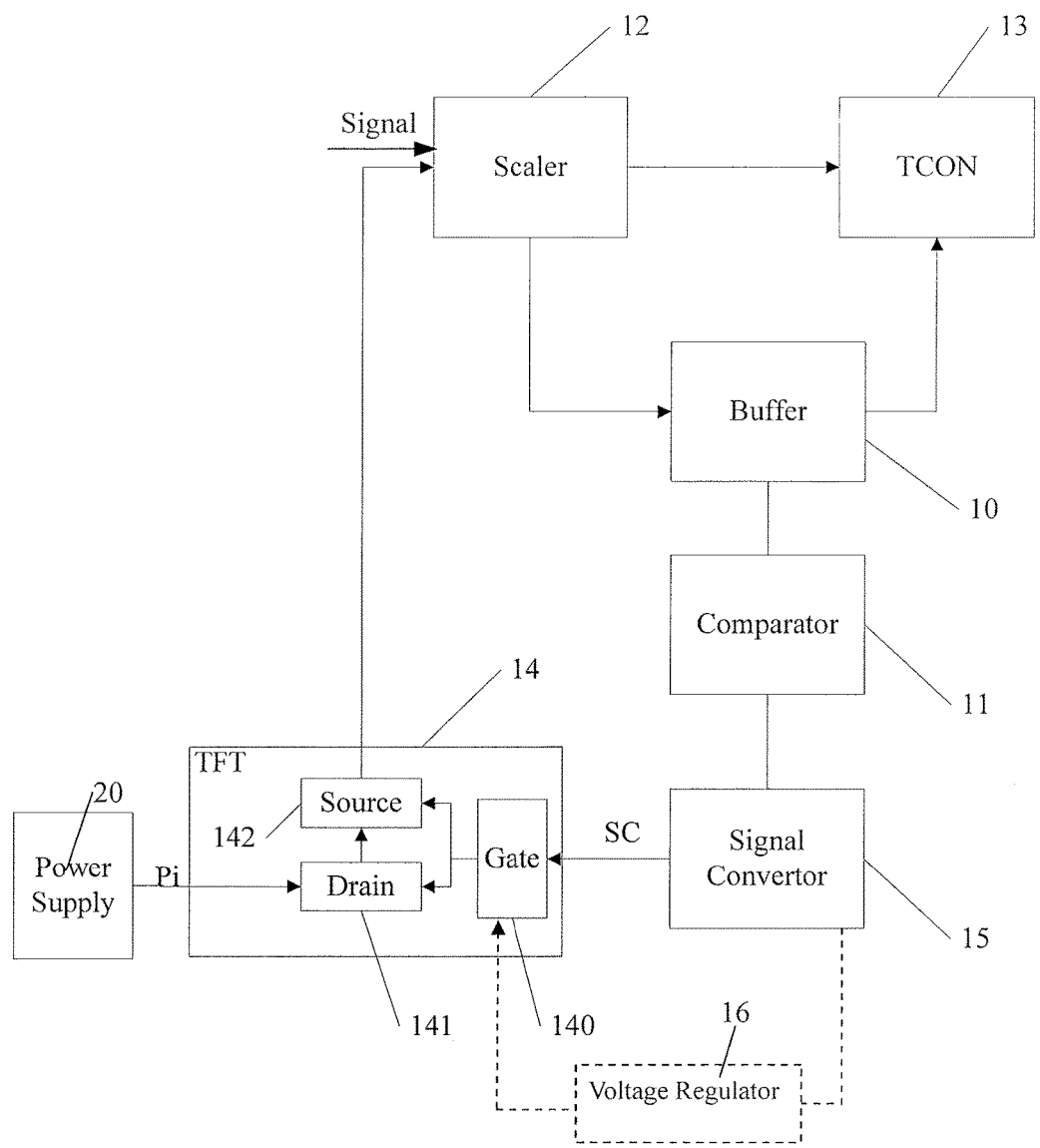
FIG. 3 is another structure block diagram of the display device provided by the second embodiment of the disclosure.

When a level signal is adopted to control the operating state of the scaler 12, if the comparison result outputted by the comparator 11 is a level signal, for instance, the operating state of the scaler 12 may be controlled by the switcher 14 directly according to the comparison result outputted by the comparator 11. FIG. 2 is a schematic structural view of the device adopting the switcher 14 to control the operating state of the scaler 12 directly according to the comparison result outputted by the comparator 11. If the comparison result outputted by the comparator 11 is not a level signal, the display device of the embodiment may further comprise a signal converter 15 arranged between the switcher 14 and the comparator 11. As illustrated in FIG. 3, the signal converter 15 converts the comparison result, which is not a level signal and outputted by the comparator 11, into a level signal.

In an example of the present embodiment, a thin film transistor (TFT) may be adopted for the switcher 14. Of course, the disclosure is not limited thereto.

FIGS. 2 and 3 are schematic structural views of the display device adopting a TFT to control the operating state of the scaler. In the embodiment, if the comparison result outputted by the comparator 11 is not a level signal, the TFT is connected with the comparator 11 through the signal converter 15, as illustrated in FIG. 3. If the comparison result outputted by the comparator 11 is a level signal, the TFT may be directly connected with the comparator 11, as illustrated in FIG. 2.

In the embodiment, in the example as illustrated in FIG. 3, a gate electrode 140 of a TFT14 functioning as the switcher is connected with the signal converter 15 to receive a level signal SC converted by the signal converter 15 according to the comparison result outputted by the comparator 11; and in the example as illustrated in FIG. 2, the gate electrode 140 of the TFT14 functioning as the switcher is directly connected with the comparator 11 to receive a level signal SC outputted by the comparator 11. The level signal SC corresponds to the comparison result outputted by the comparator 11 and may be a high level signal or a low level signal.

A drain electrode 141 of the TFT14 is connected with a power supply 20 of the display device to receive a first voltage Pi which may be identical with the operating voltage of the scaler 12; Pi corresponds to the operating voltage of the scaler 12, is 3.3V or 2.5V in general, and may be also 1.8V; and the power supply 20 supplies the operating voltage for the scaler 12 and may be a direct current supply, a battery or the like.

A source electrode 142 of the TFT14 is connected with the scaler 12. If the TFT is an N-type TFT, when the level signal SC is a high level signal, the TFT14 is in its ON state, and the source electrode 142 and the drain electrode 141 are electrically connected to conduct a current; the voltage outputted from the source electrode 142 is the first voltage Pi inputted from the power supply 20; after the first voltage Pi is inputted into the scaler 12, the scaler 12 enters the operating state and performs scaling processing on the received current frame image; and correspondingly, the TCON 13 acquires the pixel data obtained by the scaling processing on the current frame image by the scaler 12, so as to display the current frame image. When the level signal SC is a low level signal, the TFT14 is in its OFF state, the source electrode 142 and the drain electrode 141 are electrially disconnected and cannot conduct a current; at this point, no voltage is outputted to the scaler 12, and the scaler 12 is hence switched off and in the off-operating state; and correspondingly, the TCON 13 acquires the pixel data stored in the buffer 10 to display the corresponding frame image.

In another aspect, a P-type TFT may be also adopted in the embodiment of the disclosure. In this case, when the level signal SC is a low level signal, the TFT14 is in its ON state, the source electrode 142 and the drain electrode 141 are electrically connected to conduct a current, and the first voltage Pi is outputted to the scaler 12 so that the scaler 12 is in the operating state. When the level signal SC is a high level signal, the TFT14 is in its OFF state, the source electrode 142 and the drain electrode 141 are electrically disconnected and cannot conduct a current, and no voltage is outputted to the scaler 12 so that the scaler 12 is in the off-operating state.

In another example, if the signal voltage outputted by the comparator 11 or the level signal voltage converted by the signal converter 15 is too high or too low and not just the voltage capable of driving the TFT14 to switch on, a voltage regulator 16 may be further arranged between the TFT14 and the signal converter 15 or directly connected between the comparator and the TFT14 and used for regulating the voltage of the level signal to be the value enough to drive the TFT14 to switch on. The example is as illustrated with the dashed line part of FIGS. 2 and 3.

In the examples of the embodiment, the TFT may be used for realizing the function of the switches, and the power supply for the scaler in the display device and the level signal outputted by the comparator are adopted to control the operating state of the scaler. Therefore, the embodiment can be implemented in a simple way and the energy consumption can be reduced as well.

Figure 5:
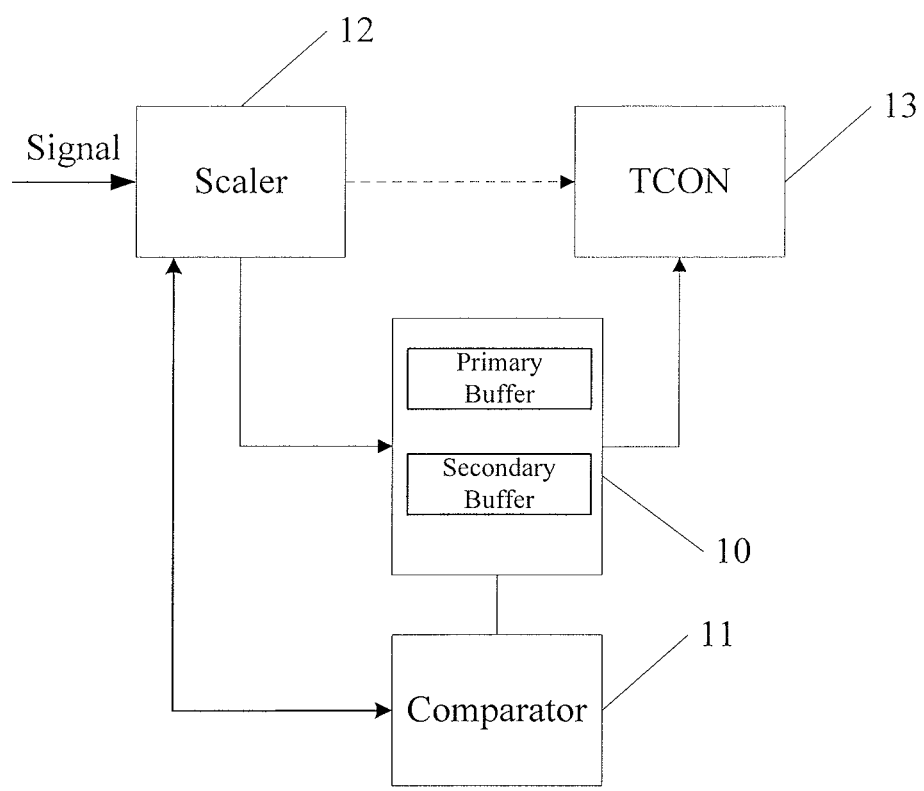
FIG. 5 is a flow chart of a frame display method provided by a fourth embodiment of the disclosure.

A further modification of the technical solutions of the first and second embodiments is given in a third embodiment of the disclosure. For example, as illustrated in FIG. 5, the buffer 10 includes a primary buffer and a secondary buffer; the primary buffer is used for storing the pixel data obtained by the scaling processing on the current frame image by the scaler 12, for instance, storing pixel data of a dynamic video having adjacent frame images that are different to each other, when the scaler 12 is in the operating state; and the secondary buffer is used for storing pixel data of a predetermined frame image such as pixel data with a high frequency of occurrence in a certain period of time or the pixel data of successive several frame images that are identical with each other. For example, within a predetermined time period threshold or a predetermined frame amount threshold, if the scaler 12 is in the off-operating state or the pixel data stored in the primary buffer are unchanged, the pixel data of the frame image stored in the primary buffer may be transferred to the secondary buffer for storage. Or alternatively, a user may set the frame amount threshold according to the display duration and the display frequency of the frame image corresponding to the predetermined pixel data. In another embodiment of the disclosure, a multi-level buffer may be arranged for the buffer 10 according to the display frequency of frame images and are used for correspondingly storing pixel data corresponding to frame images of different display frequencies.

For example, in the case of the buffer 10 including the primary buffer and the secondary buffer, when a frame image arrives, the comparator 11 may compare the pixel data of this current frame image from the scaler 12 with the pixel data stored in the primary buffer at first. When the comparison result obtained through comparison with the primary buffer is "identical", the TCON 13 can directly output the frame image corresponding to the pixel data stored in the primary buffer, and meanwhile, the comparator 11 may further compare the current pixel data with the pixel data stored in the secondary buffer. When the comparison result obtained through comparison with the secondary buffer is also "identical", the value of t or n may be properly increased, for instance, by 25 percent. When the comparison result obtained through comparison with the primary buffer is "non-identical", the pixel data of the current frame image are used for updating those stored in the primary buffer; same with the foregoing description in the first and second embodiment, the TCON 13 may acquire the pixel data of the current frame image from the scaler 12 or the buffer 10 to display the corresponding frame image, and then the comparator may further compare the current pixel data with the pixel data stored in the secondary buffer. When the comparison result obtained through comparison with the secondary buffer is also "non-identical", the value of t or n, for instance, may be properly reduced, for instance, by 25 percent, but should be not less than a certain threshold value. Therefore, the power consumption of the system can be further reduced. For example, when the time period during which the pixel data stored in the primary buffer are unchanged (not updated) is longer than a predetermined time period T1 or the duration of a predetermined amount N1 of successive frame images, the pixel data stored in the secondary buffer are updated by the pixel data stored in the primary buffer. The predetermined time period T1 or the predetermined frame image amount N1 may be set according to the predetermined time period t or the predetermined frame image amount n during which the scaler is in the off-operating state. For example, the predetermined time period T1, for instance, may be 2t or 3t, and the predetermined frame image amount N1, for instance, may be 2n or 3n.

For example, in an example, the user may clear the pixel data stored in the secondary buffer according to actual conditions, for instance, clearing all the contents stored in the secondary buffer or replacing the content stored in the secondary buffer with the pixel data different from the pixel data both stored in the primary buffer and the secondary buffer. Therefore, the pixel data which are not called and compared by the comparator 11 in a certain period of time, namely pixel data with low display frequency in a certain period of time, may be cleared. When the secondary buffer is empty, the comparison with the secondary buffer may be not performed in the foregoing examples.

The example of arranging the multi-level buffers in the buffer 10, provided by the third embodiment, can further reduce the use frequency of the scaler, reduce the power consumption of the system, and save energy. Although the third embodiment including the primary buffer and the secondary buffer, taken as an example, is illustrated, the disclosure is not limited hereto and more levels of buffer may be used as required.

In the embodiments of the disclosure, for example, in the display devices provided by the first to third embodiments, the arrangement of the buffer 10 and the comparator 11 is relatively flexible. For example, the buffer 10 or the comparator 11 may be arranged inside the TCON 13 (i.e., integrally formed with the TCON 13) and may also be arranged inside the display device. Or alternatively, for instance, the scaler 12 and the TCON 13 may be integrated in a same chip, and the buffer 10 and/or the switcher 14 may be arranged on the integrated chip and of course may also be arranged separately from the chip. Of course, for the examples comprising the signal converter 15 and the voltage regulator 16, the signal converter 15 and the voltage regulator 16 may be flexibly arranged in view of the position of the buffer 10 and/or the switcher 14.

Moreover, the buffer 10, the scaler 12, the comparator 11, the TCON 13, the signal converter 15 and other components may be implemented by means of hardware, software, firmware and so on and may adopt any proper specific component(s) in the relevant technical field. For example, the buffer 10 may be embodied in a volatile memory, a nonvolatile memory or the like; the scaler 12 and the TCON 13 can be those in a traditional display device or those newly developed; when the comparison result is a digital signal, the signal converter 15 may be an analog-digital convertor; the voltage regulator may be a voltage transformer or a resistor divider.

Figure 4:
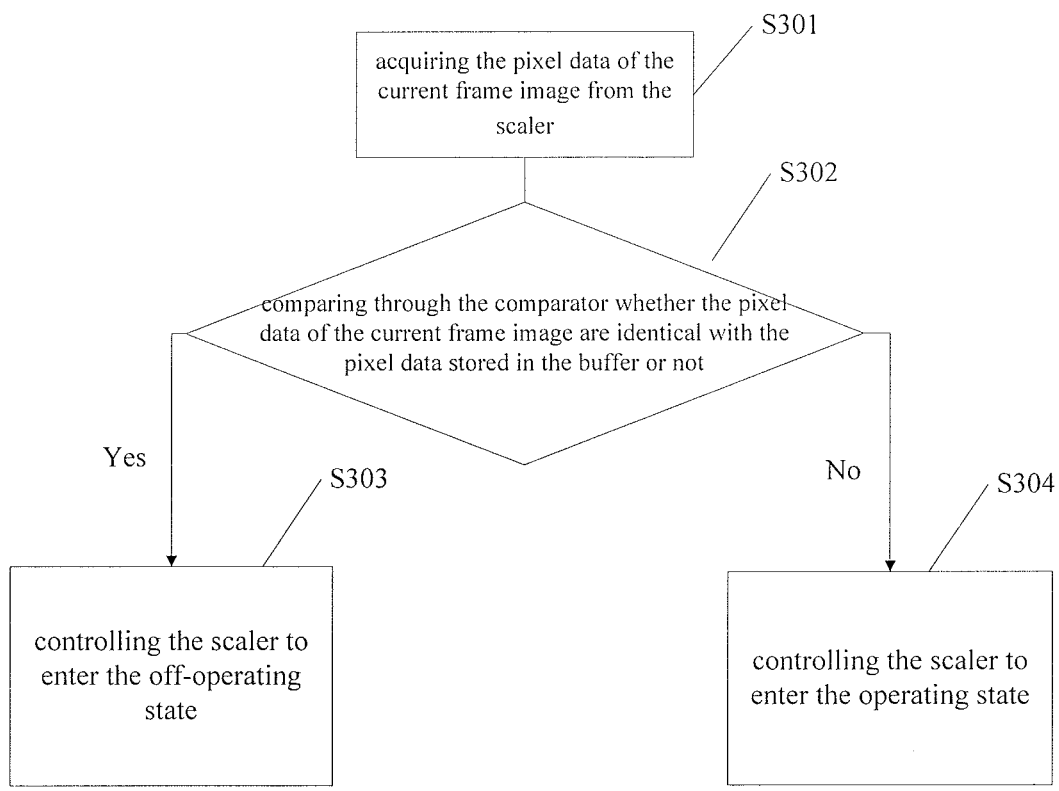
FIG. 4 is a structure block diagram of a display device provided by a third embodiment of the disclosure.

A fourth embodiment of the disclosure also provides a display method for the display device provided by the embodiments (e.g., the first to third embodiments) of the disclosure. The process is as illustrated in FIG. 4.

Step S301: acquiring the pixel data of the current frame image from the scaler.

Step S302: comparing through the comparator whether the pixel data of the current frame image are identical with the pixel data stored in the buffer or not, executing step S303 if so, and executing step S304 if not.

Step S303: controlling the scaler to enter the off-operating state, and acquiring the pixel data stored in the buffer through the TCON so as to display the frame image corresponding to the pixel data.

Step S304: controlling the scaler to enter the operating state, acquiring the pixel data of the current frame image through the TCON so as to display the current frame image, and updating the pixel data stored in the buffer by the pixel data of the current frame image.

For example, when the primary buffer and the secondary buffer are arranged inside the buffer 10, the comparator 11 may compare the pixel data of the current frame image with those of the levels of the buffer. When pixel data of a current frame image are sent from the scaler, the operation of the comparator 11 and the TCON 13 is as mentioned above and will not be described further.

For example, in the image display process of the display device, a level signal may be used for controlling the operation state of the switcher 14 and further controlling the operating state of the scaler 12.

For example, the display device may comprise the switcher 14, and as illustrated in FIGS. 2 and 3, the switcher 14 may be implemented in an N-type TFT or a P-type TFT and is connected with the power supply 20 of the display device. The power supply 20 for the scaler in the display device and the level signal outputted from the comparator 11, for instance, are adopted to control the operating state of the scaler 12. Therefore, the process is simple and the energy consumption is also reduced.

The frame image display method provided by the embodiment of the disclosure can control the operating state of the scaler according to whether the current frame image is identical with the frame image stored in the buffer or not. When both the frame images are identical to each other, the scaler may enter the off-operating state, so that the problem of repetitively performing scaling processing on frame images having the same contents by the scaler can be avoided, thus the power consumption can be reduced and the energy can be saved.

The display device or the display device adopting the frame image display method may be any product or component with a display function, for example, a liquid crystal display (LCD) panel, an electronic paper (EP), an organic light-emitting display (OLED) panel, an LCD television, an LCD, a digital photo frame, a mobile phone, a tablet PC and so on.

A fifth embodiment of the disclosure also provides a display system, which, for example, comprises the display device provided by any one of the first to third embodiments, and may adopt the display method provided by the fourth embodiment for the display of frame images. The structure of the display device in the system and the frame image display method are the same with the device and the method provided by the foregoing embodiments. The specific structure and the specific process will not be described further. Moreover, the display system may be formed by the splicing or the combination of the display devices.

Obviously, various modifications and variation can be made to the disclosure by those skilled in the art without departing from the spirit and the scope of the disclosure.

The invention claimed is:

1. A display device, used for displaying a video signal including a plurality of successive frame images, comprising a timing controller (TCON), a scaler, a buffer, a switcher and a comparator, wherein:
the scaler is used for performing scaling processing on the frame images of the video signal to generate pixel data for display;
the buffer is used for storing the pixel data obtained by the scaling processing on the frame images by the scaler;
the comparator is used for comparing whether pixel data of a current frame image from the scaler are identical with pixel data stored in the buffer or not and outputting a comparison result;
the TCON is used for acquiring the pixel data of the current frame image to be displayed and outputting the pixel data for display;
if the comparison result outputted by the comparator is "identical", the scaler enters an off-operating state which lasts for a predetermined time period or a predetermined frame amount, and the predetermined time period or the predetermined frame amount is adjusted based on dynamics of the frame images; and if the comparison result outputted by the comparator is "non-identical", the scaler enters an operating state, and the pixel data stored in the buffer are updated by the pixel data of the current frame image subjected to scaling processing;
the switcher is configured to receive an input of a first voltage that is identical to an operating voltage of the scaler and determine to send the first voltage to the scaler or not according to the comparison result outputted by the comparator;
the buffer includes: a primary buffer used for storing pixel data of a previous frame, image obtained by the scaling processing by the scaler, wherein the previous frame image is a frame image from the plurality of successive frame images and is prior to the current frame image; and a secondary buffer used for storing pixel data of a predetermined frame image;
the comparator compares whether the pixel data of the current frame image from the scaler are-non-identical with the pixel data stored in the primary buffer or not, and further compares whether the pixel data of the current frame image from the scaler are identical with the pixel data stored in the secondary buffer or not; and
if the pixel data of the current frame image from the scaler is identical with the pixel data stored in the primary buffer and the pixel data stored in the secondary buffer, the predetermined time period or the predetermined frame amount is increased; or, if the pixel data of the current frame image from the scaler is non-identical with the pixel data stored in the primary buffer and the pixel data stored in the secondary buffer, the predetermined time period or the predetermined frame amount is decreased.

2. The display device according to claim 1, wherein the switcher is used for controlling the scaler to enter the the operating state or the off-operating state according to the comparison result outputted by the comparator.

3. The display device according to claim 2, further comprising a signal converter used for converting the comparison result outputted by the comparator into a level signal which is used for controlling the scaler to enter the the operating state or the off-operating state.

4. The display device according to claim 2, wherein the switcher acts for controlling the scaler to enter the the operating state or the off-operating state according to the comparison result outputted by the comparator as a level signal.

5. The display device according to claim 3, wherein the switcher is an N-type thin-film transistor (TFT); a gate electrode of the N-type TFT is for receiving the level signal; a drain electrode of the N-type TFT is connected with a power supply to receive the first voltage which is identical with the operating voltage of the scaler; a source electrode of the TFT is connected with the scaler; when the level signal is a high level signal, the N-type TFT is in an ON state and outputs the first voltage to the scaler, so that the scaler enters the operating state, and when the level signal is a low level signal, the N-type TFT is in an OFF state and no voltage is outputted to the scaler, so that the scaler enters the off-operating state; or
the switcher is a P-type TFT; a gate electrode of the P-type TFT is for receiving the level signal; a drain electrode of the p-type TFT is connected with the power supply to receive the first voltage which is identical with the operating voltage of the scaler; a source electrode of the p-type TFT is connected with the scaler; when the level signal is a low level signal, the TFT is in the ON state and outputs the first voltage to the scaler, so that the scaler enters the operating state, and when the level signal is a high level signal, the p-type TFT is in the OFF-state and no voltage is outputted to the scaler, so that the scaler enters the off-operating state.

6. The display device according to claim 4, wherein the switcher is an N-type thin-film transistor (TFT); a gate electrode of the N-type TFT is for receiving the level signal; a drain electrode of the N-type TFT is connected with a power supply to receive the first voltage which is identical with the operating voltage of the scaler; a source electrode of the TFT is connected with the scaler; when the level signal is a high level signal, the N-type TFT is in an ON state and outputs the first voltage to the scaler, so that the scaler enters the operating state, and when the level signal is a low level signal, the N-type TFT is in an OFF state and no voltage is outputted to the scaler, so that the scaler enters the off-operating state; or
the switcher is a P-type TFT; a gate electrode of the P-type TFT is for receiving the level signal; a drain electrode of the p-type TFT is connected with the power supply to receive the first voltage which is identical with the operating voltage of the scaler; a source electrode of the p-type TFT is connected with the scaler; when the level signal is a low level signal, the TFT is in the ON state and outputs the first voltage to the scaler, so that the scaler enters the operating state, and when the level signal is a high level signal, the p-type TFT is in the OFF-state and no voltage is outputted to the scaler, so that the scaler enters the off-operating state.

7. The display device according to claim 3, further comprising a voltage regulator used for regulating an voltage of the level signal, so that the level signal is capable of driving the switcher to switch on.

8. The display device according to claim 4, further comprising a voltage regulator used for regulating an voltage of the level signal, so that the level signal is capable of driving the switcher to switch on.

9. The display device according to claim 1, wherein the secondary buffer removes the pixel data stored therein after a predetermined time period.

10. The display device according to claim 1, wherein at least one of the buffer and the comparator is arranged inside the TCON.

11. The display device according to claim 1, wherein the scaler and the TCON are integrated in a same chip, and at least one of the buffer and the comparator is arranged on the chip.

12. A display method for the display device according to claim 1, comprising the following steps of:
  comparing through the comparator whether the pixel data of the current frame image from the scaler are identical with the pixel data stored in the buffer or not, in which if the comparison result of the comparator is "identical", the scaler is controlled to enter the off-operating state which lasts for a predetermined time period or a predetermined frame amount; and if the comparison result of the comparator is "non-identical", the scaler is controlled to enter the operating state, and the pixel data stored in the buffer are updated by the pixel data of the current frame image subjected to scaling processing; and
  outputting a frame image, corresponding to the pixel data stored in the buffer, for display through the TCON.

13. The display method according to claim 12, wherein the buffer comprises a primary buffer and a secondary buffer, and comparing through the comparator whether the pixel data of the current frame image from the scaler are identical with the pixel data stored in the buffer or not further comprises the step of:
  comparing through the comparator whether the pixel data of the current frame image are identical with the image pixel data stored in the primary buffer or not and output a comparison result, in which if the comparison result is "identical", the scaler enters the off-operating state which lasts for the predetermined time period or the predetermined frame amount; and if the comparison result is "non-identical", the scaler enters the operating state.

14. The display method according to claim 13, further comprising the step of comparing through the comparator whether the pixel data of the current frame image are identical with the frame image pixel data stored in the secondary buffer or not and output a comparison result.

15. The display device according to claim 1, wherein if the comparison result outputted by the comparator is "identical", the TCON obtains the pixel data stored in the buffer as the pixel data of the current frame image to be displayed and outputs the pixel data stored in the buffer for display.

16. The display device according to claim 1, wherein if the pixel data of the current frame image from the scaler are non-identical with the pixel data stored in the primary buffer, the primary buffer is updated with the pixel data of the current frame image.

17. A display device, used for displaying a video signal including a plurality of successive frame images, comprising a timing controller (TCON), a scaler, a buffer and a comparator,
  wherein the scaler is used for performing scaling processing on the frame images of the video signal to generate pixel data for display;
  the buffer is used for storing the pixel data obtained by the scaling processing on the frame images by the scaler;
  the comparator is used for comparing whether pixel data of a current frame image from the scaler are identical with pixel data stored in the buffer or not and outputting a comparison result; and
  the TCON is used for acquiring the pixel data of the current frame image to be displayed and outputting the pixel data for display; and
  wherein if the comparison result outputted by the comparator is "identical", the scaler enters an off-operating state which lasts for a predetermined time period or a predetermined frame amount, and the predetermined time period or the predetermined frame amount is adjusted based on dynamics of the frame images; and if the comparison result outputted by the comparator is "non-identical", the scaler enters an operating state, and the pixel data stored in the buffer are updated by the pixel data of the current frame image subjected to scaling processing;
  wherein the buffer includes:
    a primary buffer used for storing pixel data of a previous frame image obtained by the scaling processing by the scaler, wherein the previous frame image is a frame image from the plurality of successive frame images and is prior to the current frame image; and
    a secondary buffer used for storing pixel data of a predetermined frame image;
  wherein the comparator compares whether the pixel data of the current frame image from the scaler are non-identical with the pixel data stored in the primary buffer or not, and further compares whether the pixel data of the current frame image from the scaler are identical with the pixel data stored in the secondary buffer or not; and
  wherein if the pixel data of the current frame image from the scaler is identical with the pixel data stored in the primary buffer and the pixel data stored in the secondary buffer, the predetermined time period or the predetermined frame amount is increased; or, if the pixel data of the current frame image from the scaler is non-identical with the pixel data stored in the primary buffer and the pixel data stored in the secondary buffer, the predetermined time period or the predetermined frame amount is decreased.

* * * * *